United States Patent
Blakemore

(10) Patent No.: US 6,888,262 B2
(45) Date of Patent: May 3, 2005

(54) METHOD AND APPARATUS FOR WIND TURBINE ROTOR LOAD CONTROL

(75) Inventor: Ralph W. Blakemore, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 10/357,660

(22) Filed: Feb. 3, 2003

(65) Prior Publication Data

US 2004/0151584 A1 Aug. 5, 2004

(51) Int. Cl.$^7$ ................................................. F03D 7/00
(52) U.S. Cl. ............................ 290/44; 290/55; 416/61
(58) Field of Search ............................ 290/43, 44, 54, 290/55; 416/61, 175

(56) References Cited

U.S. PATENT DOCUMENTS

| | | | |
|---|---|---|---|
| 4,025,230 A | * 5/1977 | Kastan | 416/18 |
| 4,088,352 A | * 5/1978 | Kling | 290/55 |
| 4,298,313 A | 11/1981 | Hohenemser et al. | 416/98 |
| 4,352,023 A | * 9/1982 | Sachs et al. | 290/42 |
| 4,420,692 A | 12/1983 | Kos et al. | 290/44 |
| 4,435,647 A | 3/1984 | Harner et al. | 290/44 |
| 4,452,410 A | * 6/1984 | Everett | 244/12.2 |
| 4,495,423 A | 1/1985 | Rogers | 290/44 |
| 4,613,762 A | 9/1986 | Soderholm | 290/44 |
| 4,822,247 A | * 4/1989 | Heinz | 416/189 |
| 4,936,750 A | * 6/1990 | Heinz | 416/196 A |
| 5,225,712 A | 7/1993 | Erdman | 290/44 |
| 5,749,540 A | * 5/1998 | Arlton | 244/17.13 |

FOREIGN PATENT DOCUMENTS

WO  WO 01/33075 A1  5/2001

OTHER PUBLICATIONS

P. Caselitz et al., "Reduction of Fatigue Loads on Wind Energy Converters by Advanced Control Methods," European Wind Energy Conference, Oct. 1997, pp. 1–4, Dublin Castle, Ireland.

N. Kelley et al., "The NREL Large–Scale Turbine Inflow and Response Experiment–Preliminary Results," National Wind Technology Center, National Renewable Energy Laboratory, pp. 412–426, #AIAA–2002–0064, Golden, Colorado.

* cited by examiner

*Primary Examiner*—Nicholas Ponomarenko
(74) *Attorney, Agent, or Firm*—Blakely, Sokoloff, Taylor & Zafman LLP

(57) ABSTRACT

A wind turbine. In one embodiment, the wind turbine includes a platform and one or more gyroscopes connected to the platform to detect movement of the platform. A control circuit is coupled with the one or more gyroscopes to determine loads placed on one or more turbine components and to mitigate the loads in response to signals from the one or more gyroscopes.

29 Claims, 5 Drawing Sheets

METHOD AND APPARATUS FOR WIND TURBINE ROTOR LOAD CONTROL

FIELD

The invention relates to wind turbines. More particularly, the invention relates to load control.

BACKGROUND

Utility grade wind turbines (i.e., wind turbines designed to provide electrical power to a utility grid) can have large rotors (e.g., 30 or more meters in diameter). Because of the size of the rotors, changes in wind direction and/or speed can result in significant loads on components of the wind turbine. Various techniques exist for reducing the load including, for example, generator torque control and/or controlling the pitch of the blades.

Current techniques for measuring loads on the wind turbine components typically require the use of a large number of sensors and a correspondingly complex control system to analyze the sensor data and control the components of the wind turbine accordingly. In general, the more complex the sensor network and the control system, the more expensive the wind turbine. Also, more complex systems have increased failure rates and require more time to develop and to manufacture.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for modifying the load of a wind turbine based on gyroscopic measurements are described. The use of traditional load sensing technology (e.g., strain gauge and proximity probes) requires that numerous sensors be placed in and on various wind turbine components. As turbines increase in size and power rating, and increasingly more complex controls are required to mitigate the damaging effects of fatigue and extreme loads, the number of sensors needed also increases. With the increased number of sensors, comes increased calibration, maintenance and replacement costs and sensor failures can result in unacceptable loss of revenue and customer dissatisfaction. In one embodiment, use of a three-axis gyroscope platform can significantly reduce the number of sensors used to control the wind turbine.

In one embodiment, the gyroscope platform includes one or more gyroscopes and is mounted to the bedplate of the wind turbine. Dynamic displacement of the bedplate, for example, caused by asymmetric rotor loading, produce inertia loads that are measured as angular rates of change by the gyroscopes. For a piezo-electric gyroscope, a crystal is bent in proportion to the inertial loading. This action produces a voltage that can be used as an input signal to a control system. An input for each of the pitch, yaw and roll displacements of the bedplate can be used to determine the magnitude and orientation of a resultant load operating on the rotor. With this information, blade pitch settings can be controlled to provide maximized power production with reduced fatigue and extreme loading damage as compared to other systems having more sensors.

Figure 1:
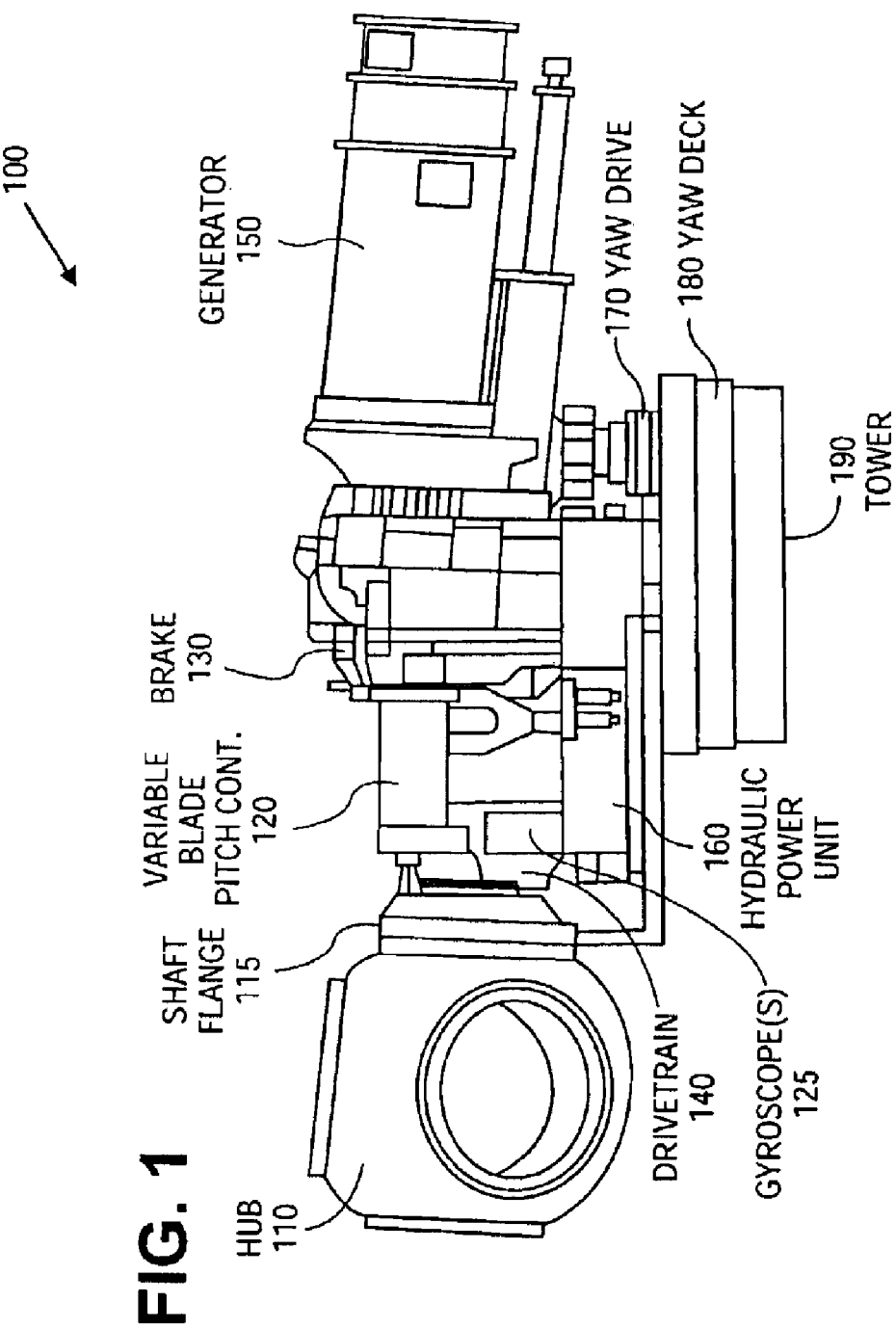
FIG. 1 is one embodiment of wind turbine components.

FIG. 1 is one embodiment of a portion of a wind turbine. The components of FIG. 1, except for hub 110, are housed in a nacelle (not shown in FIG. 1) atop tower 190. The height of tower 190 can be selected based on factors and conditions known in the art. In one embodiment, wind turbine components 100 include a distributed microcontroller based control system. In such an embodiment, multiple microcontrollers (not shown in FIG. 1) are used for overall system monitoring and control including pitch and speed regulation, high-speed shaft and yaw brake application, yaw and pump motor application and fault monitoring. Alternative distributed or centralized control architectures can also be used.

In one embodiment, the control system provides control signals to variable blade pitch controller 120 to control the pitch of blades (not shown in FIG. 1) that drive hub 110 as a result of wind. In one embodiment, hub 110 receives three blades; however, any number of blades can be used. In one embodiment, the pitch of the blades can be individually controlled by blade pitch controller 120. Hub 110 and the turbine blades combine to form a wind turbine rotor.

Brake 130 can be used to prevent hub 110 from rotating. Drive train 140 includes a main shaft connected to hub 110 and a gear box that, in one embodiment, utilizes a planetary gear set to drive a high speed shaft enclosed within the gear box. The high speed shaft is used to drive generator 150. In one embodiment, a doubly-fed asynchronous generator 150 is mounted to the mainframe. Other types of generators, for example, wound rotor synchronous generators can also be used. Alternatively, a direct drive configuration in which hub 110 is directly connected to generator 150 can also be used. As another alternative, hub 110 can also include an integrated gearbox that is connected to generator 150.

Yaw drive 170 and yaw deck 180 provide a yaw control system for the wind turbine. In one embodiment, the yaw system is electrically operated and controlled by the control system based on information received from a wind vane (not shown in FIG. 1) mounted on the nacelle. In one embodiment, the yaw system is mounted on a cylindrical flange provided at the top of tower 190.

Wind turbine component and structural loads have historically been difficult to accurately assess. With wind turbines being designed for use in various electric power generation markets, dynamic load alleviation and mitigation is increasingly important. For this reason, component designs and turbine control systems are becoming more and more involved with both active and passive load mitigation and alleviation technology. Active system control requires input information for use in determining what action, if any, is required to achieve or maintain an acceptable operating condition.

Typically, implementation of long-lived, reliable sensors is difficult. For example, climatic exposure, vibration caused by dynamic loading, rotating forces, and the need for a rotating interface or telemetry for transmitting loads data to the turbine's control system present difficult challenges. To reduce the complexity, cost and reliability problems associated with conventional sensor types currently used on key components such as, for example, the blades, hub, main shaft, main frame, yaw deck and tower, described herein is the use of a gyroscope platform that can be attached to the mainframe, or other suitable structure.

The gyroscope platform contains one or more gyroscopes used to sense motion. Load asymmetry in the turbine rotor produces forces and moments that are reacted in many of the turbine's key components. For example, loads and moments transmitted from the rotor through the hub and main shaft produce reaction loads and moments in the mainframe. As the mainframe reacts to these loads and moments, surface deflection and distortion occurs along with larger scale movement. The combined displacement of the mainframe is sensed by the gyroscope platform. A gyroscope (e.g., an electromechanical gyroscope, a piezo-electric gyroscope, a laser-based device is a device capable of sensing linear or angular displacement) can be used to measure the displacement of the mainframe. Peizo-gyros are useful because they provide broad bandwidth and are typically more rugged than electromechanical gyroscopes and typically cost less than laser gyroscopes.

Figure 2:
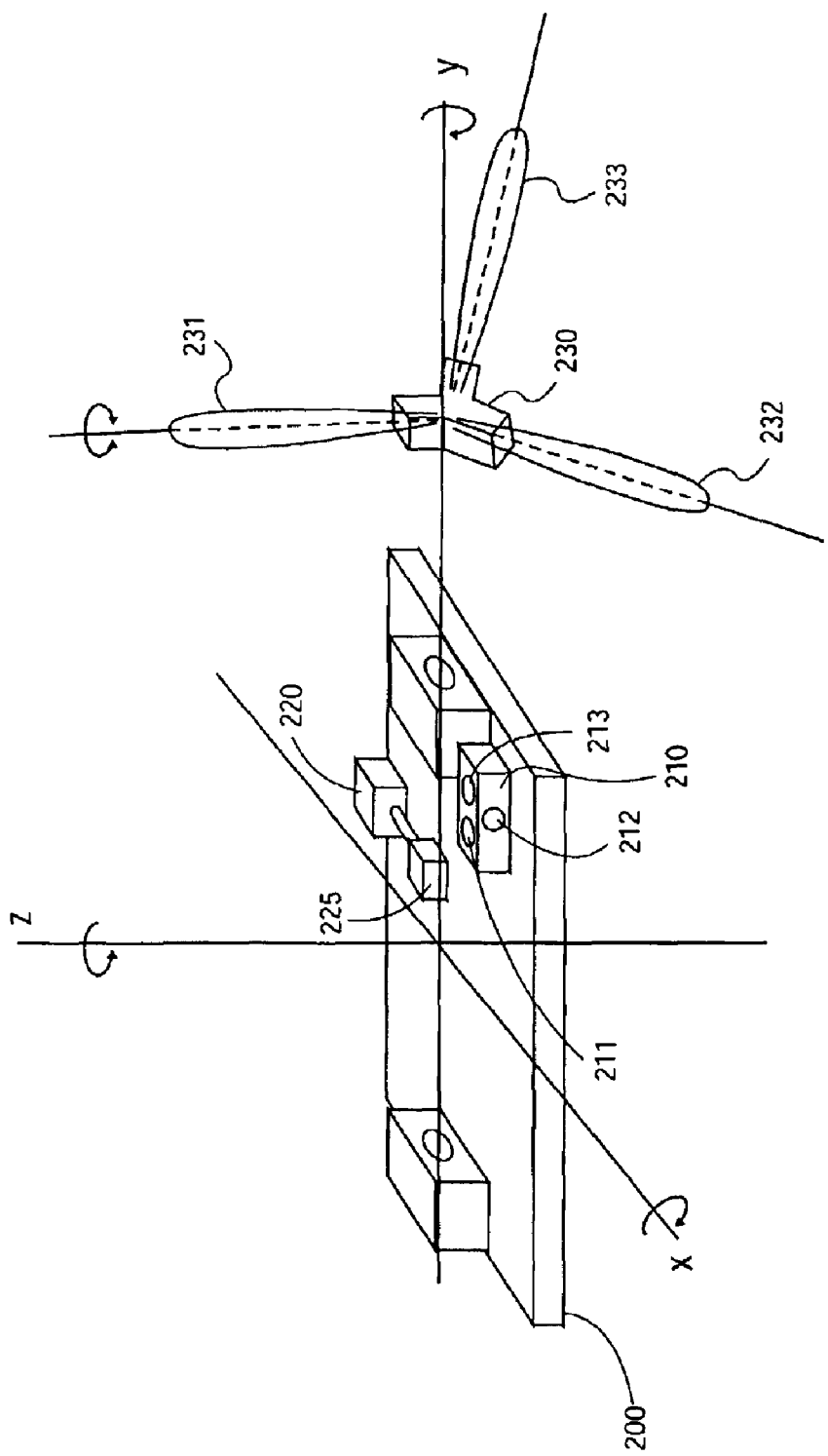
FIG. 2 is a block diagram of a wind turbine rotor and mainframe with a gyroscope platform and a turbine controller.

FIG. 2 is a block diagram of a wind turbine rotor and mainframe with a gyroscope platform and a turbine controller. In one embodiment, mainframe 200 supports various wind turbine components including turbine controller 220 and gyroscope platform 210. Gyroscope platform 210 includes one or more gyroscopes that react to movement of mainframe 200. In one embodiment, gyroscope platform 210 includes three rate-type gyroscopes. Alternatively, heading-type gyroscopes can be used to measure turn angle rather than turn rate. A different number of gyroscopes can also be used.

In one embodiment, for either type of gyroscope, a piezo crystal located within the gyroscope assembly bends due to inertial forces when the gyroscope assembly is moved. The stress and strain produced by the bending of the crystal generates a voltage. This voltage output can be used to determine the rate of displacement of the mainframe structure. This information along with the elapsed or incremental time of the event can be used to determine the magnitude, duration, and orientation of the resultant load acting on the wind turbine rotor.

Turbine controller 220 is coupled with the gyroscopes of gyroscope platform 210 to determine the movement of mainframe 200. By determining the movement of mainframe 200, turbine controller 220 can determine the loads that are placed on components of the turbine including the blades. Turbine controller 220 can then vary the pitch of the blades in response to the detected loads to reduce the loads imposed on the blades. Turbine controller 220 can also perform other functions to reduce loads, for example, by reducing generator torque.

Turbine controller 220 is coupled with blade pitch controllers in hub 230. The blade pitch controllers vary the pitch of the blades in response to signals from turbine controller 220 in a manner well-known in the art. Thus, any appropriate blade pitch controller known in the art can be used. In one embodiment, the pitch of each blade can be controlled individually. For example, if turbine controller 220 determines that loads are greater on a blade when the blade is in a generally upward position, turbine controller can cause the pitch of each of the blades to have a first pitch when the blade is in a generally upward position and to have a second pitch when the blade is not in a generally upward position.

Figure 3:
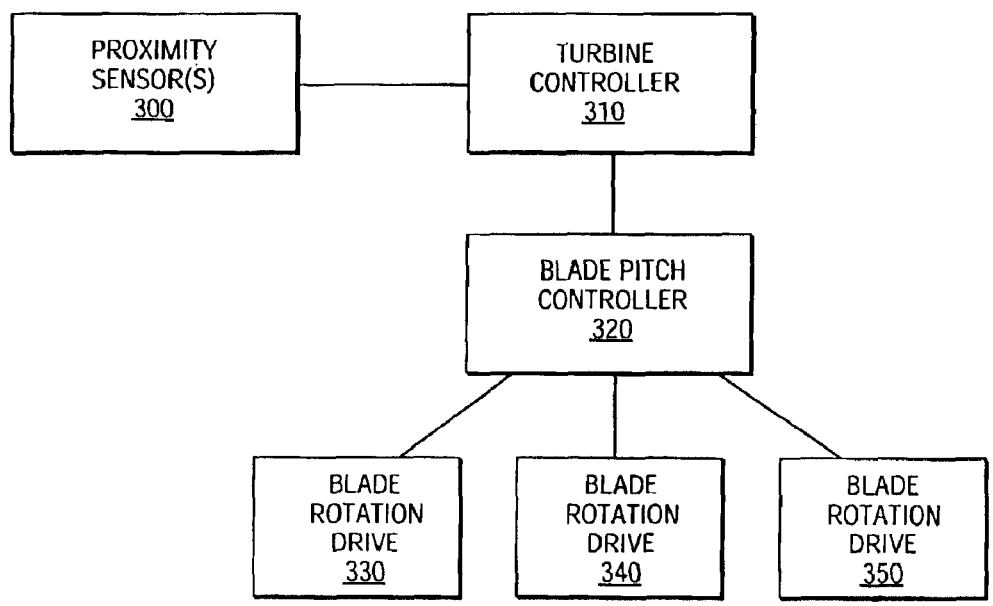
FIG. 3 is a block diagram of one embodiment of a system to control blade pitch based on gyroscopic measurements.

FIG. 3 is a block diagram of one embodiment of a system to control blade pitch based on gyroscopic measurements. Gyroscope(s) 300 generate signals in response to movement of wind turbine components, for example, the mainframe. Turbine controller 310 is coupled to gyroscope(s) 300 to receive the signals generated by gyroscope(s) 300. Turbine controller 310 analyzes the signals to determine the movement of the turbine component. The gyroscope signals can also be used by control circuitry to reduce the generator torque, or to control any turbine component.

In one embodiment, turbine controller 310 includes a processor that receives signals (either analog or digital signals) that indicate the output of gyroscope(s) 300. The processor can be, for example, a general purpose processor that executes instructions, a hardwired control circuit, or a combination of a general purpose processor and hard-wired circuitry. In response to the signals received from gyroscope(s) 300, turbine controller generates control signals that are transmitted to blade pitch controller 320.

Blade pitch controller 320 is coupled to one or more blade rotation drives (e.g., 330, 340, 350) that control the pitch of the blades of the wind turbine. By varying the pitch of the blades, the magnitude and orientation of loads placed on the turbine blade(s) and other components can be reduced, thereby improving the overall performance of the wind turbine.

Figure 4:
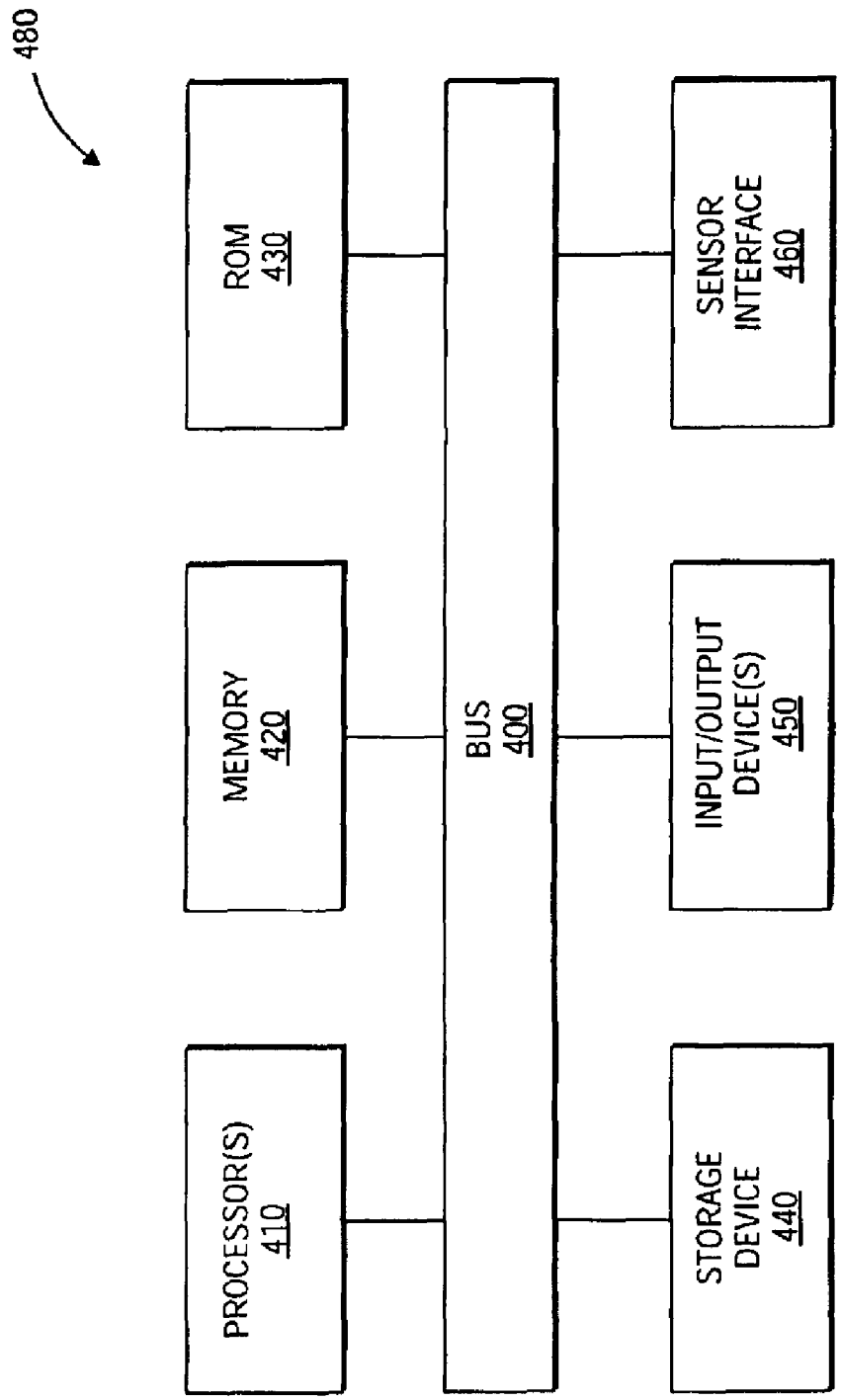
FIG. 4 is a block diagram of one embodiment of a turbine controller.

FIG. 4 is a block diagram of one embodiment of a turbine controller. Turbine controller 480 includes bus 400 or other communication device to communicate information, and processor 410 coupled to bus 400 to process information. While turbine controller 480 is illustrated with a single processor, turbine controller 480 can include multiple processors and/or co-processors. Turbine controller 480 further includes random access memory (RAM) or other dynamic storage device 420 (referred to as memory), coupled to bus 400 to store information and instructions to be executed by processor 410. Memory 420 also can be used to store temporary variables or other intermediate information during execution of instructions by processor 410.

Turbine controller 480 can also include read only memory (ROM) and/or other static storage device 430 coupled to bus 400 to store static information and instructions for processor 410. Data storage device 440 is coupled to bus 400 to store information and instructions. Input/output device(s) 450 can include any device known in the art to provide input data to turbine controller 480 and/or receive output data from turbine controller 480.

Instructions are provided to memory from a storage device, such as magnetic disk, a read-only memory (ROM) integrated circuit, CD-ROM, DVD, via a remote connection that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Sensor interface 460 is an interface that allows turbine controller 480 to communicate with one or more sensors within a wind turbine. For example, sensor interface 460 can be coupled to receive output signals from one or more gyroscopes as described above. Sensor interface 460 can be an analog-to-digital converter that converts an analog voltage signal generated by the gyroscopes to a multi-bit digital signal to be used by processor(s) 410.

Processor(s) 410 can then analyze the data and transmit data to a blade pitch controller through input/output device (s) 450 to cause the blade pitch controller to change the pitch of one or more blades of the wind turbine. Processor(s) 410 can also take other actions in response to the signals from the gyroscopes. For example, processor(s) 410 can cause a brake to be applied to stop or slow rotation of the hub or of a rotating shaft.

Figure 5:
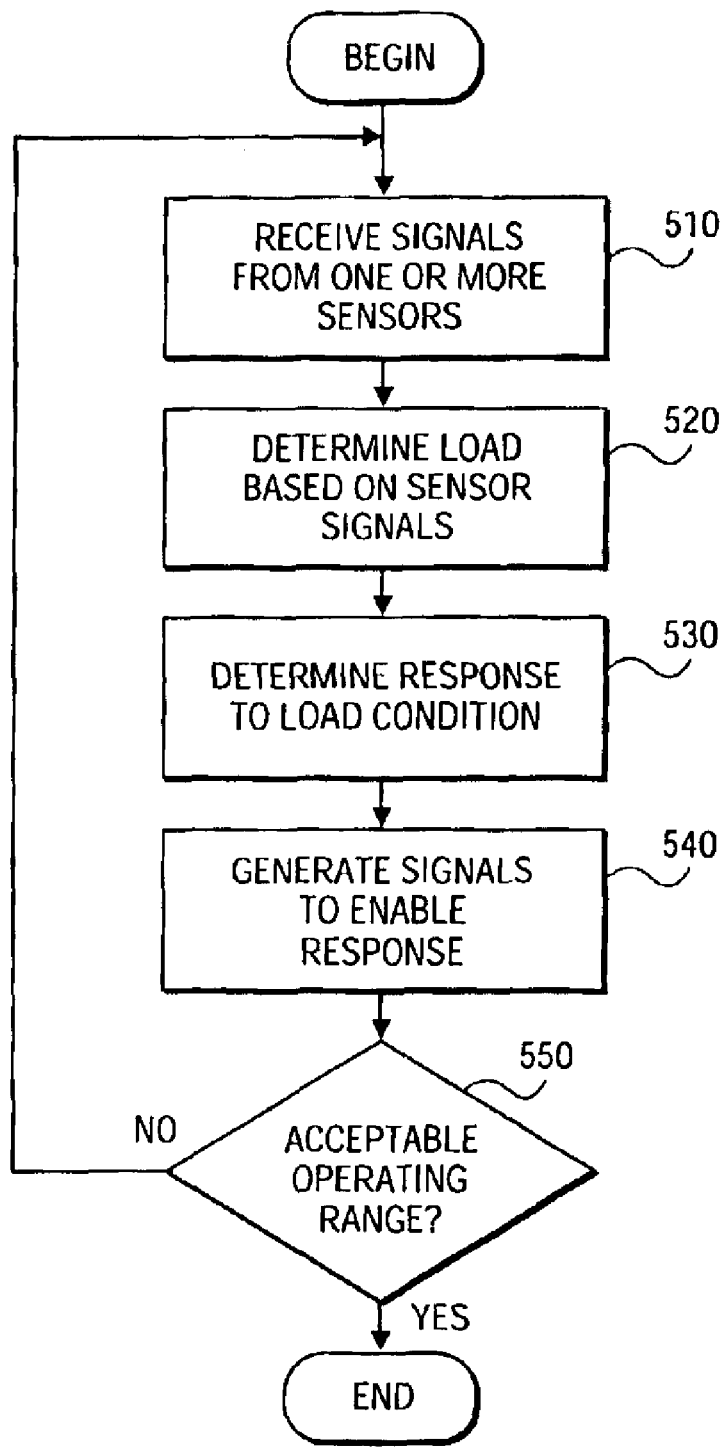
FIG. 5 is a flow diagram of one embodiment of a process for controlling the wind turbine blade pitch in response to gyroscopic measurement.

FIG. 5 is a flow diagram of one embodiment of a process for controlling wind turbine blade pitch in response to gyroscopic measurement. Referring to FIG. 5, signals from one or more gyroscopes are received (processing block 510). The component receiving the signals (e.g., a processor, an analog-to-digital converter) is coupled with the gyroscopes and converts the signals to a usable format, if necessary.

In response to the signals from the gyroscopes, a controller (e.g., a processor, hardwired control circuits, software) determines the load on one or more wind turbine components using the signals from the gyroscopes (processing block 520). The controller may use mathematical equations known in the art to convert between the input data (e.g., angular rate of rotation of a mainframe) to relevant load data (e.g., forces exerted on a blade of the wind turbine).

The controller determines a response to the load condition (processing block 530). For example, in response to an increased load on a blade of the turbine, the controller can determine that the response should be to change the pitch of one or more of the blades of the wind turbine. As another example, the controller can determine that the response should be to apply a brake to stop or slow rotation of the hub.

The controller generates the signal to enable the selected response (processing block 540). For example, the controller can generate a signal in the form of, for example, a data packet or a set of control lines, to cause a blade pitch controller to change the pitch of one or more blades. If the selected response fails to cause the wind turbine to operate within an acceptable operating range (processing block 550), the process can be repeated as necessary.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

What is claimed is:

1. A wind turbine comprising:
   a platform;
   one or more gyroscopes connected to the platform to detect movement of the platform; and
   a control circuit coupled with the one or more gyroscopes to determine loads acting on one or more turbine component in response to signals from the one or more gyroscopes, the control circuit to cause a change in operational parameters in response to the signals from the one or more gyroscopes.

2. The wind turbine of claim 1 wherein the control circuit mitigates the load by controlling a pitch of one or more blades.

3. The wind turbine of claim 1 further comprising a gyroscope platform connected to the platform, the gyroscope platform having one or more gyroscopes to detect linear rates of change of the platform.

4. The wind turbine of claim 1 further comprising a gyroscope platform connected to the platform, the gyroscope platform having one or more gyroscopes to detect angular rates of change of the platform.

5. The wind turbine of claim 1 wherein the one or more gyroscopes detect a pitch displacement of the platform.

6. The wind turbine of claim 1 wherein the one or more gyroscopes detect a yaw displacement of the platform.

7. The wind turbine of claim 1 wherein the one or more gyroscopes detect a roll displacement of the platform.

8. The wind turbine of claim 1 wherein the one or more gyroscopes comprises one or more piezo-electric gyroscopes.

9. The wind turbine of claim 1 wherein the one or more gyroscopes comprises one or more electromechanical gyroscopes.

10. The wind turbine of claim 1 wherein the one or more gyroscopes comprises one or more laser gyroscopes.

11. The wind turbine of claim 1 further comprising a memory coupled with the control circuit to store instructions to be executed by the control circuit, wherein the instructions cause the control circuit to determine a load based on the signals from the one or more gyroscopes.

12. The wind turbine of claim 11 further comprising a blade pitch controller coupled with the control circuit, wherein the instructions cause the control circuit to cause the blade pitch controller to change the pitch of one or more blades.

13. A wind turbine comprising:
    a first platform;
    means for detecting movement of the first platform; and
    means for mitigating wind turbine loads in response to signals from the one or more gyroscopes.

14. The wind turbine of claim 13 wherein the means for mitigating wind turbine loads comprises means for controlling a pitch of one or more blades.

15. The wind turbine of claim 14 wherein the means for detecting movement of the first platform comprise means for detecting angular rates of change of the first platform.

16. The wind turbine of claim 14 wherein the means for detecting movement of the first platform comprise means for detecting linear rates of change of the first platform.

17. The wind turbine of claim 14 wherein the means for detecting movement of the first platform comprises means for detecting a pitch displacement of the first platform.

18. The wind turbine of claim 14 wherein the means for detecting movement of the first platform comprises means for detecting a yaw displacement of the first platform.

19. The wind turbine of claim 14 wherein the means for detecting movement of the first platform comprises means for detecting a roll displacement of the first platform.

20. A method comprising:
    receiving signals from one or more gyroscopes indicating movement of a wind turbine platform;
    determining a load placed on one or more components of a wind turbine based on the signals from the gyroscope; and
    changing one or more operational parameters based on the determined load.

21. The method of claim 20 wherein changing the one or more operational parameters comprises causing one or more blades of the wind turbine to change pitch based on the determined load.

22. The method of claim 20 further comprising the one or more gyroscopes detecting angular rates of change of the platform; and generating the signals received from the gyroscopes, the signals being proportional to the angular rates of change detected.

23. The method of claim 20 further comprising the one or more gyroscopes detecting linear rates of change of the platform; and generating the signals received from the gyroscopes, the signals being proportional to the linear rates of change detected.

24. A method comprising:
receiving signals from one or more gyroscopes indicating movement of a wind turbine platform atop a tower;
determining movement of the platform based on the signals from the gyroscope; and
causing one or more blades of the wind turbine to change pitch based on the determined movement.

25. The method of claim 24 further comprising the one or more gyroscopes detecting angular rates of change of the platform; and generating the signals received from the gyroscopes, the signals being proportional to the angular rates of change detected.

26. The method of claim 24 further comprising the one or more gyroscopes detecting linear rates of change of the platform; and generating the signals received from the gyroscopes, the signals being proportional to the linear rates of change detected.

27. An article comprising an electronically-readable medium having stored thereon instructions that, when executed, cause one or more processors to:
receive signals from one or more gyroscopes indicating movement of a wind turbine platform atop a tower;
determine a load placed on one or more components of a wind turbine based on the signals from the gyroscope; and
cause one or more blades of the wind turbine to change pitch based on the determined load.

28. The article of claim 27 wherein the one or more gyroscopes detect angular rates of change of the platform and the signals received from the gyroscopes are proportional to the angular rates of change detected.

29. The article of claim 27 wherein the one or more gyroscopes detect linear rates of change of the platform and the signals received from the gyroscopes are proportional to the linear rates of change detected.

* * * * *